United States Patent [19]

Wheaton

[11] 4,188,553
[45] Feb. 12, 1980

[54] POCKET RECEPTACLE FOR SECURING A SENSING ELEMENT WITHIN ELECTRICAL WINDINGS

[75] Inventor: William H. Wheaton, Sharpsburg, Ky.

[73] Assignee: A. O. Smith Corporation, Milwaukee, Wis.

[21] Appl. No.: 875,995

[22] Filed: Feb. 8, 1978

[51] Int. Cl.² .......................................... H02K 11/00
[52] U.S. Cl. .................................. 310/68 C; 338/25; 338/28; 361/25
[58] Field of Search ...................... 310/68 R, 68 C, 71, 310/42, 194; 318/471, 473; 338/22, 23, 24, 25, 28; 361/25, 26, 27

[56] References Cited

U.S. PATENT DOCUMENTS

| | | | |
|---|---|---|---|
| 3,127,531 | 3/1964 | Tothero | 310/68 C |
| 3,131,322 | 4/1964 | Pleiss | 310/68 R |
| 3,246,183 | 4/1966 | Slonneger | 310/68 R |
| 3,515,917 | 6/1970 | Kolb | 310/71 |
| 3,842,297 | 10/1974 | Pleiss | 310/68 C |
| 4,028,570 | 6/1977 | Kieffer | 310/68 C |

Primary Examiner—R. Skudy
Attorney, Agent, or Firm—Andrus, Sceales, Starke & Sawall

[57] ABSTRACT

An electrical insulating pocket receptacle for securing a sensing element within electrical windings of a motor includes a sheet-like flexible material having a body support portion supporting a pocket within which the element is located and having four tabs projecting from the body support portion. The tabs on the opposite side of the pocket are located within the winding and hold the pocket in place within the winding with an exposed open end for insertion and removal of the element. A wire holding tab is secured to one of the support tabs and is folded upon itself and secured against the coil end turns by the end tie cords. A third locking tab is pulled down over the spade of the sensing element to securely hold the sensing element in place. A fourth tab may be used to fold over the pocket to additionally insulate the sensing element from the windings of the motor in which the insulating pocket receptacle is inserted.

3 Claims, 8 Drawing Figures

POCKET RECEPTACLE FOR SECURING A SENSING ELEMENT WITHIN ELECTRICAL WINDINGS

BACKGROUND OF THE INVENTION

The invention relates to an electrical insulating support adapted for insertion within an electrical winding to secure a sensing element therein. The support has generally been formed by folding of an insulating sheet upon itself to form an enclosure which receives and secures a sensing element and which is adapted to be handily located within the end coils of an electric motor. One type of receptacle that has been provided to hold a sensing element is that described and claimed in U.S. Pat. No. 3,842,297 which is assigned to a common assignee with the invention here described.

SUMMARY OF THE INVENTION

The invention relates to an insulating pocket receptacle adapted for insertion into electrical windings to receive and secure a sensing element in place. Generally, the electrical insulating pocket receptacle includes a pocket secured to a body support portion for mounting within the end turns of dynamoelectric machine. The pocket provides an internal cavity which is open at one end to receive the sensing element. The pocket is of a configuration conforming in general to that of the sensing element to securely hold the sensing element within the pocket and within the end turns. In a particularly unique structure, the support portion is formed of a flexible sheet-like member to which a separate pocket is firmly secured with laterally projecting sheet-like tabs. The receptacle is located within the coil end turns with the pocket located between coil ends and the tabs projected and located between the adjacent coil ends. An element locking tab extends longitudinally outwardly from the open end of the pocket and has an aperture therein for interlocking over a projection on the sensing element to lock the latter securely within the pocket.

In another unique feature of the invention, a wire holding tab is secured as by an integral connection to a support tab to the body support portion of the pocket receptacle. An elongated tube is secured to the wire holding tab and extends outwardly therefrom at generally right angles to the pocket. The winding leads are passed through the tube and across the face of the wire holding tab and then axially outwardly for connection into the winding circuit. Upon insertion of the receptacle in the windings, the tab is folded upon itself and about the tube and then folded against the end turns and secured in place by the conventional end turn tie cords. The inner edge of the wire holding tab is folded back upon itself to present a smooth surface to the wire leads extending outwardly from the tab to prevent disruption of the insulation.

A further tab may be secured to the body portion extending from the bottom of the pocket. This tab may be folded over the pocket to better insulate the sensing element from the windings.

The pocket receptacle of this invention provides a reliable and firm support for a sensing element within the windings and may be readily assembled in a commercially practical and low cost fabrication process.

BRIEF DESCRIPTION OF THE DRAWINGS

The drawings furnished herewith illustrate the best mode presently contemplated by the inventor and clearly disclose the above advantages and features as well as others which will be readily understood from the detailed description thereof.

In the drawings.

DESCRIPTION OF ILLUSTRATED EMBODIMENT

Figure 1:
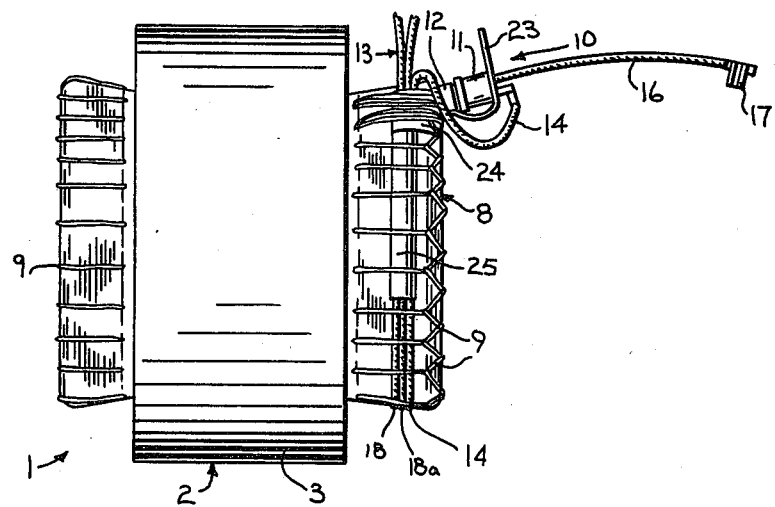
FIG. 1 is a side view of a dynamoelectric machine illustrating the employment of a sensing receptacle and a sensing element in accordance with one embodiment of the present invention.
Figure 2:
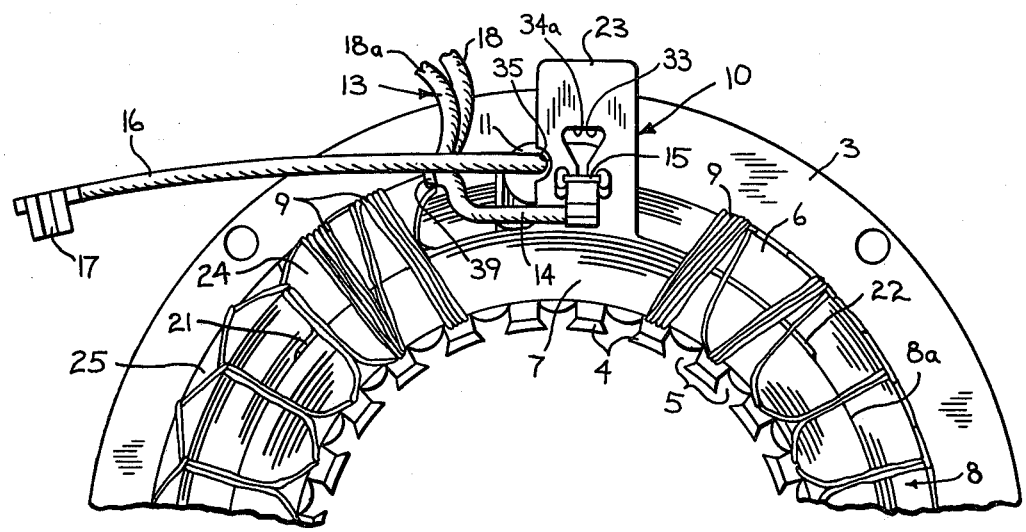
FIG. 2 is a fragmentary end view of the dynamoelectric machine shown in FIG. 1.

Referring to the drawings and particularly to FIGS. 1 and 2, the present invention is illustrated applied to a dynamoelectric machine 1 such as a motor of which the stator and coil assembly 2 is illustrated. The stator and coil assembly 2 is shown of the well-known annular construction including a magnetic stator core 3 having integral circumferentially spaced teeth 4 which define correspondingly spaced slots 5. A main winding 6 and a phase winding 7 are wound and located within the slots in any well-known manner. The windings 6 and 7 are energized from a suitable source in accordance with conventional practice and develop an electric field which in co-operation with a rotor (not shown) provide the desired generator or motor action.

The stator windings 6 and 7 include individual coils which are wound within the slots and include integral end turns 8 located to the opposite ends or sides of the magnetic core 3. The coils of windings 6 and 7 and the integral end turns 8 are circumferentially spaced and also overlap. The overlapping end turns are separated by suitable insulation sheets 8a. The coil end turns 8 are suitably secured in place with respect to each other and the stator core such as through tie cords 9 or the like. An overload sensing unit 10 is generally located within the winding end turns 8 and in particular between the respective end turns of the phase windings 6 and 7. As shown, the unit 10 is located between the adjacent winding coils or winding 6 and project inwardly between coils of windings 6 and 7. The sensing unit 10 generally includes a temperature sensitive element 11 located within an insulating and supporting receptacle 12. The element 11 may be any one of the well-known overload protectors such as a snap action or bimetal electric switch which responds to abnormal motor operating conditions. The sensing element may, for example, in accordance with well-known practice, be connected in series with the stator windings. In the illustrated embodiment of the invention, the stator leads 13 are secured in place by the tie cords 9 against the end turns 8 adjacent the sensing unit 10. A first lead 14 from the stator windings 6 and 7 is adapted to be releaseably interconnected to one side of a sensing element 11 by means of a terminal 15 of the element 11. A second power connecting lead 16 of the sensing element 11 has an outer terminal 17 which with another stator lead 18 connects the incoming motor energizing power line, not shown, to the stator windings 6 and 7. For example, a motor driven compressor, not shown, may include a terminal block to which leads 16 and 18 are secured. The overload sensing element 11 is normally closed to complete the electric circuit through the stator windings. Any abnormal sensed operating condition, however, results in the opening of the sensing element 11, thereby disconnecting of the stator winding from the power source and ceasing motor operation. As the motor structure is well-known, no further discussion thereof is deemed necessary or given other than as clearly necessary to describe the present invention which is particularly directed to the sensing apparatus or unit 11 which is located within the end turns of the windings 6 and 7.

Referring particularly to FIGS. 1-4, the receptacle 12 which particularly discloses a preferred embodiment of this invention is shown and more fully described. The receptacle 12 is shown in a developed view. Generally, the receptacle 12 includes a formed pocket 19 having a back body support sheet 20 defining an internal cavity which generally conforms to the rectangular shape of the sensing end element 11 and which is open at one end to receive the sensing element 11. The element 11 protrudes from the pocket, with the terminal 15 and lead 16 extending from the exposed end. The pocket 19 is interconnected and forms an integrated part of the body support sheet which is shown as a flat, flexible sheet 20 having lateral tabs 21 and 22 which extends laterally to opposite sides of pocket 19 for mounting of the receptacle 12 within the windings 6 and 7 in a stable and reliable manner. The pocket 19 opens axially outwardly of the end turns 8 for insertion and removal of the element 11. The sensing element 11 is firmly held within the pocket 19, preferably by a tab 23 secured to the body portion or pocket, extending over the open end and interlocked to a projection on the element 11, shown as secured to the terminal 15 of the sensing element 11.

The illustrated receptacle 12 further preferably includes an integrated stator lead support tab 24 forming an integrated part of the body portion. The tab 24 includes a tubular member 25 through which the stator leads extend for interconnection to the terminal 15 and to the power lines. The body support sheet 20 with the integrated formed pocket 19 provides a highly effective and reliable support of the assembly within the windings for convenient mounting and removal of a sensing element 11 while permitting economical fabrication of the receptacle.

Figure 3:
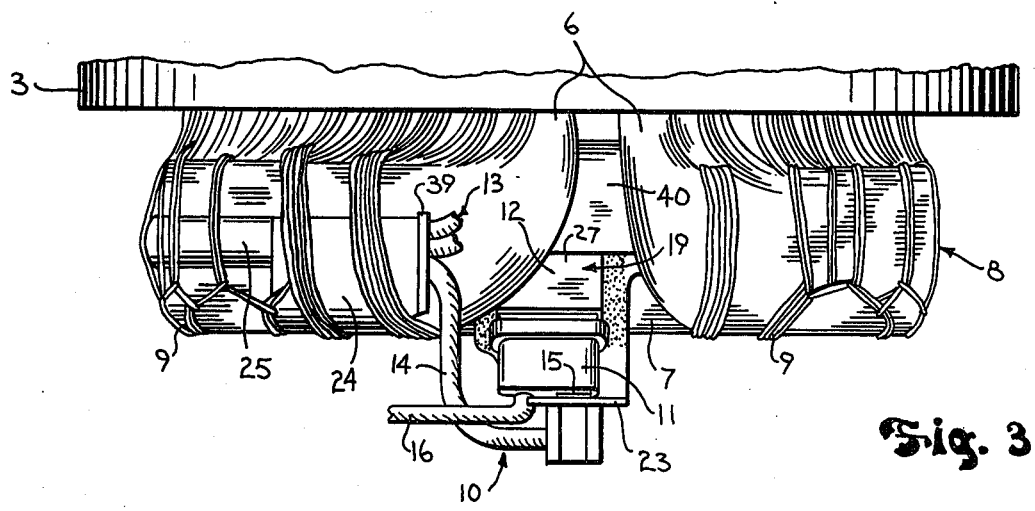
FIG. 3 is a fragmentary plan view of FIGS. 1 and 2.
Figure 4:
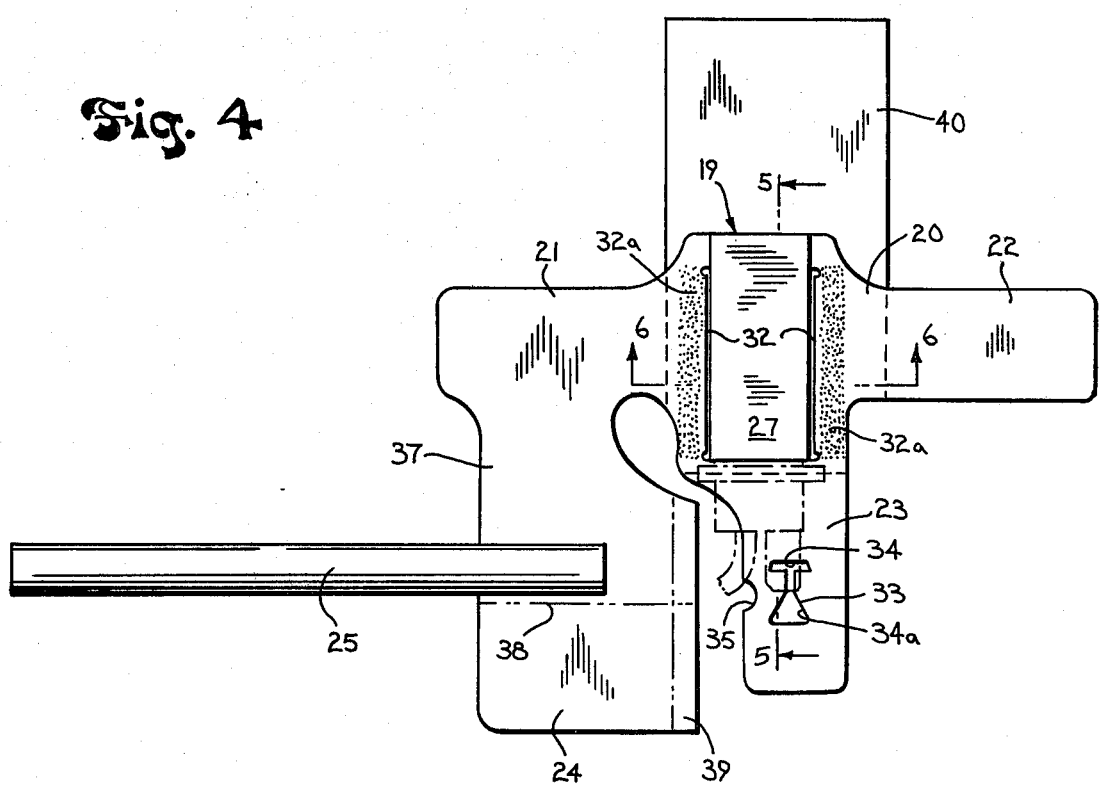
FIG. 4 is a developed view of a receptacle illustrated in FIGS. 1 and 2.
Figure 5:
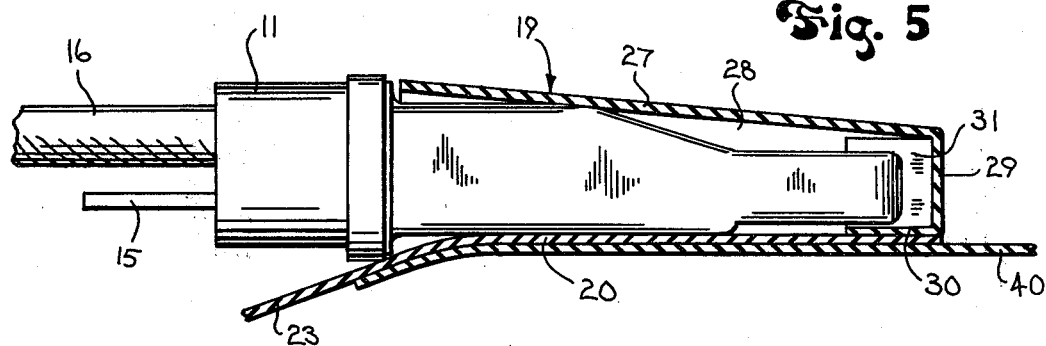
FIG. 5 is a sectional view taken generally along line 5—5 of FIG. 4 through the center of the element supporting pocket of the receptacle as illustrated in FIGS. 1 and 2.
Figure 6:
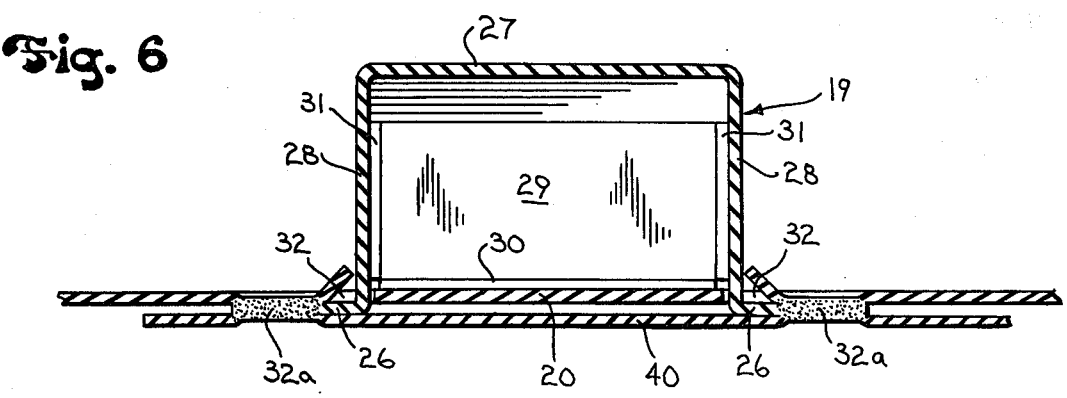
FIG. 6 is a horizontal section taken generally on line 6—6 of FIG. 4.

More particularly, in accordance with the embodiment of the invention illustrated in FIGS. 3 and 4, the illustrated sheet 20 and pocket member 19 are preferably formed of suitable insulating material such as a multiple layered dacron, mylar and dacron material. Such material is readily available in sheet form and can be folded and shaped to define an appropriate receptacle. The body support portion 20 is formed of a sheet of the material and a separate pocket member 19 is preformed of the same or other suitable material to permit shaping into a generally rectangular configuration, as shown in FIG. 4. The pocket member is provided with side attachment flanges or lips 26 permitting the firm interconnection of the pocket to the body portion by any suitable means such as thermal weld which may be conveniently created by ultrasonic welding apparatus.

Figure 7:
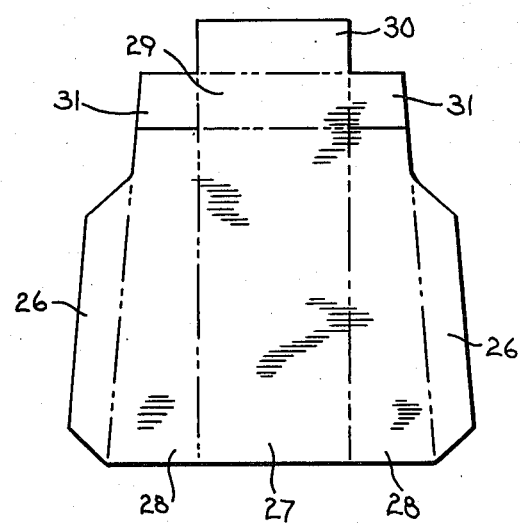
FIG. 7 is a developed view of the receptacle pocket blank.

Thus, in the illustrated embodiment of the invention, the pocket 19 is formed of a flat flexible sheet (FIG. 7) provided with a pair of parallel score lines to define the outer or front wall 27 and side walls 28 of the pocket 19. The width of the sheet extends beyond the depth of the side walls 28 to define the small attachment lips 26, extending generally the length of the pocket side walls 28. The bottom 29 of the pocket 19 is formed by bottom extension of the front wall 27 to approximately twice the depth of the pocket. The extension is thus folded back along parallel fold lines to form a bottom closure wall 29 and a small back fold to form a partial back wall 30. The bottom wall portion is further formed with lateral extensions 31 generally to the depth of the side walls which fold upwardly with the partial back wall to define a lower end of a generally rectangular pocket portion.

The pocket 19 so formed is firmly attached to the body support sheet 20 which completes the back wall thereof in the illustrated embodiment.

The body support sheet 20 thus includes a generally rectangular back wall portion of a depth and width slightly greater than the depth and width of the pocket 19. The back wall portion is provided with a pair of parallel slots or slits 32 having circular ends and of a length slightly longer than the pocket attachment lips 26. In assembly, the preformed pocket 19 has the lips extended through the slits 32, bent or folded to abut the back side of the back wall portion and firmly joined through any suitable means. For example, the lips and sheet may be joined by a high strength thermal bond 32a which can be created employing suitably shaped heating and pressure dies. The bottom or closed end of the receptacle is formed by folding the walls 29, 30 and 31 into the front and side walls of the pocket as illustrated to define the lower end thereof.

In the illustrated embodiment of the invention the element interlock tab 23 is integrally formed with the sheet 20 and projects outwardly of the pocket wall portion. The tab 23 is generally aligned with the spade terminal 15. The tab 23 includes a generally wine-glass shaped opening 33 with a base slot 34 generally corresponding to the width of the spade terminal 15 and a stem portion projecting outwardly to an inverted V-shaped portion 34a. This permits the assembly of the tab 23 downwardly over the spade terminal 15 and by deflection of the stem portion movement of the tab slot 34 into locking engagement with the spade terminal 15, as in FIGS. 1 and 2. The edge of the tab 23 is provided with an edge recess 35 mating with the power connecting lead 16.

In addition the laterally extending tabs 21 and 22 are located generally centrally of the pocket portion. The tabs 21 and 22 extend circumferentially between the end turns 8 of the overlapped coils of windings 6 and 7 to firmly support the pocket receptacle 12 within the windings between adjacent coils. The one tab 21 further includes the offset stator lead support tab 24 to which the tubular lead guide or tube 25 is interconnected.

In the illustrated embodiment of the invention, the lead support tab 24 is formed as an integral extension having a relatively narrow connecting portion 37 located along the center of the tab 21 and extending outwardly. The inner side of the portion 37 curves outwardly to an innermost edge to create an outer enlarged rectangular portion. The connecting portion 37 is folded over the adjacent end turns 8 in assembly to locate the rectangular portion adjacent the outer surface of the end turns. The lead tube 25 is secured to the rectangular portion generally immediately below a central fold line 38 with the inner end terminating in outwardly spaced relation to the pocket and generally centrally of the tab 24.

The rectangular portion of tab 24 is folded upon itself to cover the leads and secured abutting the exterior of the end turns 8 by the tie cords 9. The narrow interconnecting portion 37 forms an edge opening at the edge of the folded tab 24. The leads 18-18a extend through the folded tab 24 and then outwardly through the opening. The innermost edge of the lead tab 24 is folded back upon itself as at 39 to define a generally smooth outermost edge. The leads 18 and 18a passing from the pocket are therefore not subject to a sharp edge which could destroy the insulation.

In addition, in the illustrated embodiment of the invention, a final separate tab 40 is shown having a width somewhat greater than the width of the pocket back wall portion. The tab 40 extends outwardly from the bottom of the pocket a distance slightly less than the depth of the pocket. The tab 40 is welded or otherwise interconnected to the receptacle and is adapted to be folded upwardly over the pocket 19 to provide additional insulation. In the illustrated embodiment of the invention, the tab 40 is shown extended upwardly over the back wall portion of sheet 20, and welded to the back side thereof simultaneously with the interconnection of the pocket lips to the back wall portion of the support sheet 20. The tab 40 may be formed of mylar or other suitable insulating material as desired.

Figure 8:
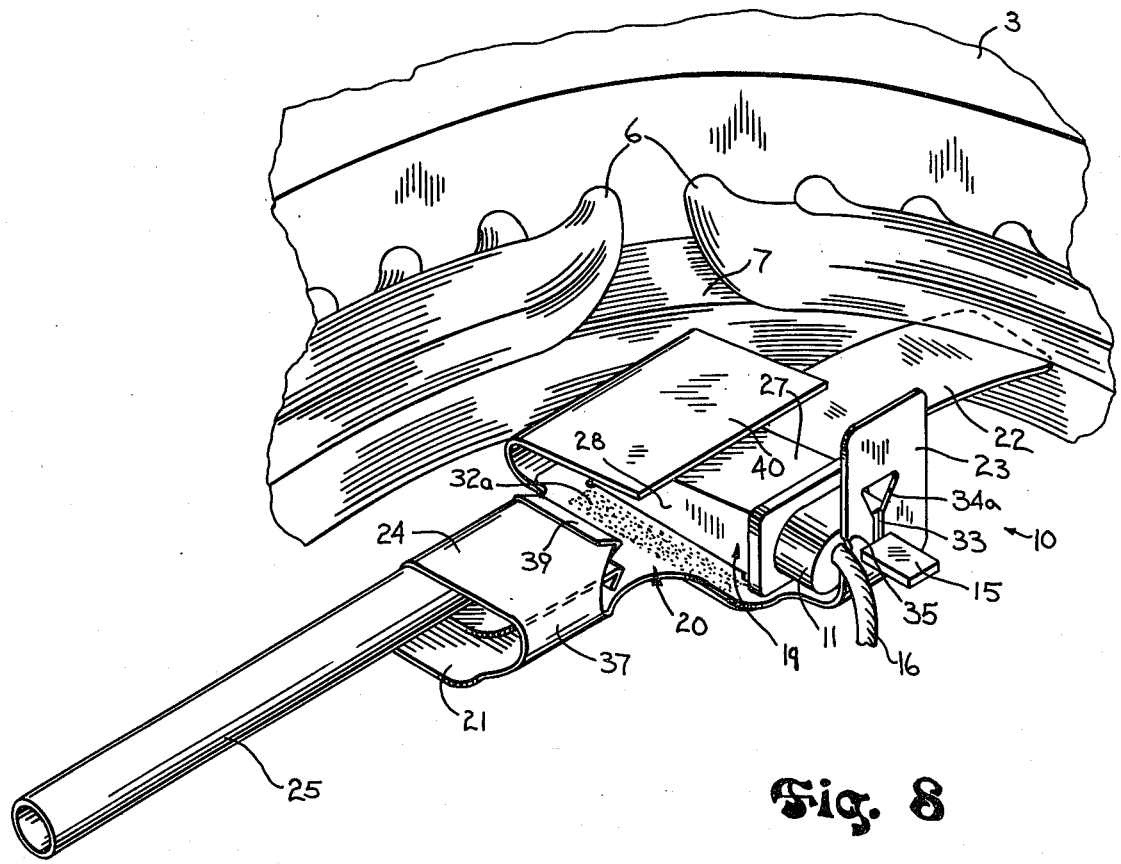
FIG. 8 is a view illustrating locating the receptacle and sensing element within the end turns of a motor winding such as shown in FIGS. 1 and 2.

In summary, in the assembly the receptacle 12 is a preformed assembly having the locking tabs 21 and 22, the locking tab 23, the lead tab 24 and the optional insulating tab 40. The receptacle 12 is inserted into the winding, as shown in FIG. 8. The lead tab 24 is assembled with the stator lead and folded upon itself and the receptacle 12 is secured in place by the tie cords 9. The sensing element 11 can be assembled prior to or after insertion of the receptacle 12 in the windings with the open end of the pocket 19 exposed for ready access. After insertion of the sensing element 11, the locking tab 23 is folded over the element 11 with the terminal 15 passing through the special glass-shaped opening 33 for locking of the sensing element 11 in position.

Although illustrated in a preferred embodiment, various modifications to the structure can, of course, be readily provided. Thus the tab portion may be integrally formed with the pocket portion with a separate back closure member or the like. The bottom of the pocket may be partially formed by the body portion or the like. In any event however, the assembly consists of an appropriate formed pocket having means for firm mounting thereof within the winding with the sensing element opening exposed for conveniently inserting and removing of the element.

Various modes of carrying out the invention are contemplated as being within the scope of the following claims, particularly pointing out and distinctly claiming the subject matter which is regarded as the invention.

I claim:

1. An electrical insulating pocket receptacle for receiving and securing a sensing element within an electrical winding of a dynamoelectric rotary machine, said receptacle having a body support portion provided from a sheet of flat flexible material, a pocket formed from a second sheet, means fixedly securing said pocket to the body portion of the sheet, said pocket providing an internal cavity open at one end to receive the sensing element and of a configuration conforming in general to that of the sensing element to securely hold the sensing element within the pocket, said support portion including a pair of support tabs extending in opposite directions from said pocket, a wire holding tab offset from the pocket and connected to one of said pair of tabs and adapted to be folded about itself in overlying relationship to said tab to form a multiple layer channel to accept leads of said windings, said folded wire holding tab being adapted to be secured abutting the exterior of the windings, and an insulating separate tab having a width greater than the width of the pocket back wall portion, and means to interconnect the tab to the back wall portion with said tab extended beyond the bottom of the pocket and support portion and adapted to be folded over the pocket to additionally insulate the front and back of the sensing element received in the pocket from the winding.

2. In an electrical insulating pocket receptacle for receiving and securing a sensing element within the windings of a dynamoelectric rotary machine which comprises a generally flexible sheet-like material having a central body portion, a separate pocket secured to the front side of the body portion to receive and hold the sensing element, said pocket being formed by a pair of upstanding side walls and a front wall spaced outwardly of the body portion and joined to the side walls to form a hollow pocket, means securing the side walls to the body of the pocket receptacle, a closure member closing one end of the pocket and the opposite end of the pocket being open to receive the sensing element, a pair of holding tabs extending in opposite directions from the body portion and adapted to extend within the windings of an dynamoelectric rotary machine to hold the pocket receptacle in place, a wire holding tab secured to the outer edge of one of said holding tabs and adapted to be folded about the leads of the dynamoelectric rotary machine winding, and the wire holding tab having a portion extending in a place parallel to the body portion of the pocket receptacle, an elongated tube secured to the wire holding tab at a position removed from the inside edge of the last named tab and extending outwardly therefrom at generally right angles to the pocket, three leads from the windings of the motor passing through the elongated tube and across the face of the wire holding tab, and the wire holding tab upon insertion of the receptacle in the windings being adapted to be folded about the tube and the wires to secure the wires and tube in place, said leads including two leads passing over the inner edge of the wire holding tab and adapted to be secured to the block of a compressor and a third lead adapted to be connected to the sensing element when the latter is located in the pocket and the inner edge portions of the wire holding tab being turned inwardly to present a smooth surface to the wires passing there over to prevent injury to the wires.

3. The electrical insulating pocket receptacle of claim 2 wherein the means securing the side walls of the pocket to the body portion being projections from the side walls extending through spaced slots in the body portion of the pocket receptacle and the projections folded to engage the back side of the body portion, and welds joining the projections of the side walls to the body portion.

* * * * *